US011333386B2

(12) United States Patent
Lian et al.

(10) Patent No.: US 11,333,386 B2
(45) Date of Patent: May 17, 2022

(54) METHOD AND APPARATUS FOR CONTROLLING AIR CONDITIONER AND AIR CONDITIONER (71) Applicant: Gree Electric Appliances, Inc. of Zhuhai, Guangdong (CN)

(72) Inventors: Caiyun Lian, Guangdong (CN); Junhong Wu, Guangdong (CN); Min Liao, Guangdong (CN); Bo Yu, Guangdong (CN); Yasong Tian, Guangdong (CN); Guangqian Peng, Guangdong (CN); Wen Che, Guangdong (CN); Zhenkun Zhai, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 92 days.

(21) Appl. No.: 16/629,668

(22) PCT Filed: Feb. 1, 2018

(86) PCT No.: PCT/CN2018/074974
§ 371 (c)(1),
(2) Date: Jan. 9, 2020

(87) PCT Pub. No.: WO2019/095561
PCT Pub. Date: May 23, 2019

(65) Prior Publication Data
US 2021/0095881 A1 Apr. 1, 2021

(30) Foreign Application Priority Data
Nov. 14, 2017 (CN) .......................... 201711133269.7

(51) Int. Cl.
*F24F 11/64* (2018.01)
*F24F 11/77* (2018.01)
*F24F 11/65* (2018.01)

(52) U.S. Cl.
CPC .............. *F24F 11/64* (2018.01); *F24F 11/65* (2018.01); *F24F 11/77* (2018.01)

(58) Field of Classification Search
CPC .. F24F 11/48; F24F 11/63; F24F 11/64; F24F 11/65; F24F 11/77; F24F 11/86;
(Continued)

(56) References Cited

U.S. PATENT DOCUMENTS

2006/0130504 A1\* 6/2006 Agrawal ................. F25B 49/02
62/228.4
2011/0049252 A1\* 3/2011 Lu .......................... G05D 23/30
236/49.3
(Continued)

FOREIGN PATENT DOCUMENTS

CN 103940058 A 7/2014
CN 104006484 A 8/2014
(Continued)

OTHER PUBLICATIONS

International Search Report, dated Jun. 13, 2018, in International application No. PCT/CN2018/074974, filed on Feb. 1, 2018.
(Continued)

*Primary Examiner* — Kidest Bahta
(74) *Attorney, Agent, or Firm* — McAndrews, Held & Malloy, Ltd.

(57) ABSTRACT

A method and an apparatus for controlling an air conditioner are provided, and the air conditioner is also provided. Herein, the method for controlling the air conditioner may include: acquiring at least one operating environment parameter of the air conditioner; determining a target tem-
(Continued)

perature of the air conditioner and a revolving speed of an internal fan according to the at least one operating environment parameter of the air conditioner; and adjusting a frequency of a compressor on the basis of the operating environment parameter and the target temperature of the air conditioner and the revolving speed of the internal fan.

18 Claims, 3 Drawing Sheets

(58) Field of Classification Search
CPC ............... F24F 2110/00; F24F 2110/10; F24F 2110/12; F24F 2110/20; Y02B 30/70
See application file for complete search history.

(56) References Cited

U.S. PATENT DOCUMENTS

| | | | |
|---|---|---|---|
| 2015/0136379 A1* | 5/2015 | Takeda | F24F 11/48 165/237 |
| 2017/0211833 A1 | 7/2017 | Tran et al. | |
| 2018/0031258 A1* | 2/2018 | Hern | F24F 11/85 |

FOREIGN PATENT DOCUMENTS

| | | | | |
|---|---|---|---|---|
| CN | 104406271 | A | 3/2015 | |
| CN | 105571047 | A | 5/2016 | |
| CN | 105650022 | A | 6/2016 | |
| CN | 103940058 | B | 2/2017 | |
| CN | 106369761 | A | 2/2017 | |
| CN | 106642592 | A | 5/2017 | |
| CN | 107084475 | A | 8/2017 | |
| CN | 107869829 | A | 4/2018 | |
| EP | 1443278 | B1 * | 2/2007 | ............. F24F 11/30 |
| EP | 3179175 | A1 | 6/2017 | |
| JP | H05203233 | A | 8/1993 | |
| WO | 2017186109 | A1 | 11/2017 | |

OTHER PUBLICATIONS

The European search report for Application No. 18879558.7, dated Jul. 2, 2021, European Patent Office, Germany (9 pages).
First Examination report dated Feb. 16, 2021 in Indian application No. 202017008848, Intellectual Property India (6 pages).

* cited by examiner

METHOD AND APPARATUS FOR CONTROLLING AIR CONDITIONER AND AIR CONDITIONER

This application is a 371 of International Patent Application No. PCT/CN2018/074974, filed Feb. 1, 2018, which claims benefit of Chinese Patent Application No. 201711133269.7, filed to the China Patent Office on Nov. 14, 2017, entitled "Air Conditioner Control Method, Apparatus, and Air Conditioner," contents of both of which are hereby incorporated by reference in their entirety.

TECHNICAL FIELD

The embodiments of the present disclosure refer to the technical field of household electric appliances, and in particular to a method and an apparatus for controlling an air conditioner, and the air conditioner.

BACKGROUND

An air conditioner has become an indispensable household electric appliance in people's lives. Refrigerating or heating comfort of the air conditioner is of importance to a human body, especially a temperature drop or rise speed and a temperature of outlet air may bring a user practical benefits and improve comfort of the user.

For better satisfying the comfort of the user, the user may manually adjust the temperature generally in a case that using the air conditioner in the related art according to experience. Indoor and outdoor ambient temperatures change greatly, and accordingly the air conditioner needs to have different temperatures in allusion to different indoor and outdoor ambient temperatures. Indoor temperature control accuracy is not exact and the user may have poor comfort experience through manual adjustment only. In a method known to the inventors, a corresponding cold and warm feeling value (the cold and warm feeling value is determined by a radiation temperature in a room and a surface temperature of the human body) at a current setting temperature is acquired, and the setting temperature of the air conditioner is adjusted according to the cold and warm feeling value. However, in order to acquire the cold and warm feeling value, a cold and warm feeling detecting apparatus needs to be mounted additionally, thereby increasing cost of an air conditioner. In another method known to the inventors, a setting temperature of an air conditioner is acquired according to an outdoor temperature and a setting temperature. But because an outdoor temperature is considered only, and an indoor environment parameter (for example, indoor humidity and an indoor temperature) or influence due to a difference between the indoor temperature and a target temperature is ignored, indoor temperature control accuracy is not exact and a temperature rise speed may not satisfy need of a user, and accordingly the user may have poor comfort experience during using the air conditioner.

How to control the temperature control accuracy of the air conditioner has become an urgent problem to be solved.

SUMMARY

According to a first aspect, the embodiments of the present disclosure provide a method for controlling an air conditioner, including: at least one operating environment parameter of the air conditioner is acquired, a target temperature of the air conditioner and a target revolving speed of an internal fan are determined according to the at least one operating environment parameter of the air conditioner, and a frequency of a compressor is adjusted on the basis of the operating environment parameter and the target temperature of the air conditioner and the target revolving speed of the internal fan.

Optionally, the operating environment parameter may be any one of indoor humidity, an indoor temperature, an outdoor temperature, a setting temperature or an electrical parameter of an element of an air conditioning system or any combination thereof.

Optionally, the operation that the target temperature of the air conditioner is determined according to the at least one operating environment parameter of the air conditioner may include: a first temperature difference between the indoor temperature and the setting temperature of the air conditioner is calculated, a temperature to be compensated is determined according to any one of the indoor humidity, the first temperature difference, the outdoor temperature or the electrical parameter of the element of the air conditioning system or any combination thereof, and the target temperature of the air conditioner is obtained on the basis of the temperature to be compensated and the setting temperature.

Optionally, the air conditioner may have multiple target temperatures. The operation that the target temperature of the air conditioner is obtained on the basis of the temperature to be compensated and a revolving speed to be compensated may include: a cooling rate in a process of achieving a last target temperature of the air conditioner is acquired, a current temperature to be compensated is obtained according to the cooling rate, and a current target temperature of the air conditioner is obtained on the basis of the last target temperature of the air conditioner and the current temperature to be compensated.

Optionally, the operation that the target revolving speed of the internal fan is determined according to the at least one operating environment parameter of the air conditioner may include: a first temperature difference between the indoor temperature and a preset temperature of the air conditioner is calculated, and the target revolving speed of the internal fan is determined according to any one of the indoor humidity, the first temperature difference, the outdoor temperature or the electrical parameter of the element of the air conditioning system or any combination thereof.

Optionally, the operation that the target revolving speed of the internal fan is determined according to the at least one operating environment parameter of the air conditioner may include: the first temperature difference between the indoor temperature and the preset temperature of the air conditioner is calculated, the revolving speed to be compensated is determined according to any one of the indoor humidity, the first temperature difference, the outdoor temperature or the electrical parameter of the element of the air conditioning system or any combination thereof, and the target revolving speed of the internal fan is obtained according to the revolving speed to be compensated and a preset revolving speed.

Optionally, before the target temperature of the air conditioner and the target revolving speed of the internal fan are determined according to the at least one operating environment parameter of the air conditioner, the method may include: the air conditioner is controlled to enter into a cool feeling mode according to a preset condition.

Optionally, the operation that the air conditioner is controlled to enter into the cool feeling mode according to the preset condition may include: a cool feeling control signal for characterizing to control the air conditioner to enter into the cool feeling mode is acquired, and the air conditioner is controlled to enter into the cool feeling mode according to the cool feeling control signal.

Optionally, the operation that the air conditioner is controlled to enter into the cool feeling mode according to the cool feeling control signal may include: a duration from a moment of acquiring the cool feeling control signal to a moment of starting the air conditioner is calculated, that whether the duration is greater than a first preset duration is judged, the air conditioner is controlled to operate in an initial cool feeling control mode in a case that the duration is less than the first preset duration, and the air conditioner is controlled to enter into the cool feeling mode in a case that an operating duration of the initial cool feeling control mode exceeds a second preset duration.

Optionally, the operation that the air conditioner is controlled to operate in the initial cool feeling control mode may include: an initial revolving speed of the internal fan is determined according to the at least one operating environment parameter of the air conditioner, and the compressor is controlled to operate at a maximum frequency according to the initial revolving speed of the internal fan and/or the target temperature of the air conditioner.

Optionally, the air conditioner is controlled to enter into the cool feeling mode in a case that the duration is greater than the first preset duration.

Optionally, the operation that the air conditioner is controlled to enter into the cool feeling mode according to the preset condition may include: that whether the outdoor temperature exceeds a first preset value is judged, a second temperature difference between the indoor temperature and the target temperature of the air conditioner is calculated in a case that the outdoor temperature exceeds the first preset value, that whether a duration of the second temperature difference exceeding a second preset value exceeds a third preset duration is judged, and the air conditioner is controlled to enter into the cool feeling mode in a case that the duration that the second temperature difference exceeds the second preset value exceeds the third preset duration.

Optionally, after the frequency of the compressor is adjusted on the basis of the operating environment parameter and the target temperature of the air conditioner, and the target revolving speed of the internal fan, the method may further include: that whether a condition of quitting the cool feeling mode is satisfied is judged, and the air conditioner is controlled to quit the cool feeling mode in a case that the condition of quitting is satisfied.

Optionally, the operation that whether the condition of quitting the cool feeling mode is satisfied is judged may include: that whether the second temperature difference is less than a third preset value is judged, and the condition of quitting is satisfied in a case that the second temperature difference is less than the third preset value.

Optionally, the operating environment parameter of the air conditioner may further include: a temperature of outlet air and/or a temperature of an internal pipe. The operation that whether the condition of quitting the cool feeling mode is satisfied is judged may include: that whether the temperature of the outlet air is less than a fourth preset value is judged, and the condition of quitting is satisfied in a case that the temperature of the outlet air is less than the fourth preset value, and/or, that whether the temperature of the internal pipe is less than a fifth preset value is judged, and the condition of quitting is satisfied in a case that the indoor temperature is less than the fifth preset value.

Optionally, in a case that the temperature of the outlet air is less than the fourth preset value and/or in a case that the indoor temperature is less than the fifth preset value, the method may include: that whether a duration of the temperature of the outlet air less than the fourth preset value exceeds a fourth preset duration is judged, and the condition of quitting is satisfied in a case that the duration that the temperature of the outlet air is less than the fourth preset value exceeds the fourth preset duration, and/or, that whether a duration the temperature of the internal pipe less than the fifth preset value exceeds a fifth preset duration is judged, and the condition of quitting is satisfied in a case that the duration that the temperature of the internal pipe is less than the fifth preset value exceeds the fifth preset duration.

Optionally, the operation that whether the condition of quitting the cool feeling mode is satisfied is judged may include: that whether a stop signal for characterizing to control the air conditioner to quit the cool feeling mode is acquired is judged, and the condition of quitting is satisfied in a case that the stop signal is acquired.

According to a second aspect, the embodiments of the present disclosure provide an apparatus for controlling an air conditioner, including: an acquisition component configured to acquire at least one operating environment parameter of the air conditioner, a determination component configured to determine a target temperature of the air conditioner and a target revolving speed of an internal fan according to the at least one operating environment parameter of the air conditioner, and an adjustment component configured to adjust a frequency of a compressor on the basis of the operating environment parameter and the target temperature of the air conditioner and the target revolving speed of the internal fan.

According to a third aspect, the embodiments of the present disclosure provide an air conditioner, including: an air conditioner body, a sensor configured to collect at least one operating environment parameter of the air conditioner, and a controller configured to implement the abovementioned method for controlling the air conditioner described in any paragraph of the abovementioned first aspect.

Optionally, the air conditioner may further include: an instruction sending apparatus configured on the air conditioner body or a remote controller of the air conditioner, and configured to send a cool feeling control signal for characterizing to control the air conditioner to enter into a cool feeling mode and a stop signal for characterizing to control the air conditioner to quit the cool feeling mode through triggering a single button or a combined button.

According to a fourth aspect, the embodiments of the present disclosure provide a non-transitory storage medium, herein, a non-transitory computer readable storage medium stores a computer instruction, and the computer instruction is configured to enable the computer to implement the method for controlling the air conditioner described in any paragraph of the abovementioned first aspect.

According to a fifth aspect, the embodiments of the present disclosure provide a method for controlling an air conditioner, including: multiple operating environment parameters of the air conditioner are acquired, a target temperature of the air conditioner and a target revolving speed of an internal fan are determined according to the multiple operating environment parameters of the air conditioner, and a frequency of a compressor is adjusted on the basis of the multiple operating environment parameters and the target temperature of the air conditioner and the target revolving speed of the internal fan.

BRIEF DESCRIPTION OF THE DRAWINGS

In order to explain the specific embodiments of the present disclosure or the technical solutions of the present disclosure more clearly, the specific embodiments or drawings required to be used in the conventional art will be simply introduced below. It is apparent that the drawings described below are only some embodiments of the present disclosure. Other drawings may further be obtained by those of ordinary skill in the art according to these drawings without creative work.

DETAILED DESCRIPTION OF THE EMBODIMENTS

The technical solutions of the present disclosure will be clearly and completely described below in combination with drawings. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

In the description of the present disclosure, it is to be noted, unless otherwise specified and limited definitely, that terms "mount", "mutually connect", "connect" and the like should be broadly understood. For example, the terms may refer to fixed connection and may also refer to detachable connection or integral connection. The terms may refer to mechanical connection and may also refer to electrical connection. The terms may refer to direct mutual connection, may also refer to indirect connection through a medium and may refer to communication in two components or wireless connection or wired connection. For those of ordinary skill in the art, specific meanings of these terms in the present disclosure may be understood according to a specific condition.

Figure 1:
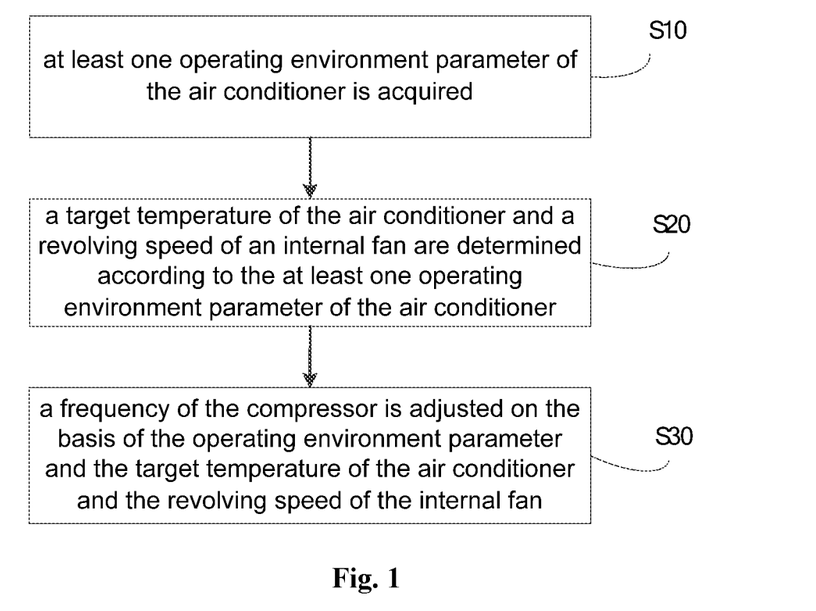
FIG. 1 is a flow diagram of a method for controlling an air conditioner of an embodiment of the present disclosure.

The embodiment of the present disclosure provides a method for controlling an air conditioner. In the embodiment, the air conditioner entering into a cool feeling mode is taken as an example for description. As shown in FIG. 1, the method may include the following steps.

S10, at least one operating environment parameter of the air conditioner is acquired. In a specific embodiment, the operating environment parameter of the air conditioner may include: any one of indoor humidity, an indoor temperature, an outdoor temperature, a setting temperature or an electrical parameter of an element of an air conditioning system or any combination thereof. In the embodiment, the indoor temperature needs to be acquired because the indoor humidity may significantly influence an apparent temperature of a human body and comfort of outlet air of the air conditioner may be perceived. The electrical parameter of the element of the air conditioning system may be calculated on the basis of an electrical parameter of a compressor, an electrical parameter of a fan motor and an alternating current parameter of the air conditioner.

S20, a target temperature of the air conditioner and a revolving speed of an internal fan are determined according to the at least one operating environment parameter of the air conditioner. In a specific embodiment, a setting temperature of a user may be corrected according to an indoor environment temperature $T_{indoor\ environment}$ and a setting temperature $T_{setting\ temperature}$, as to determine the target temperature of the air conditioner during operation. As an alternative, the setting temperature of the user may be corrected according to the indoor environment temperature $T_{indoor\ environment}$, indoor humidity RH and the setting temperature $T_{setting\ temperature}$, as to determine an indoor target temperature of the air conditioner during operation. As an alternative, the setting temperature of the user may be corrected according to the indoor environment temperature $T_{indoor\ environment}$, the setting temperature $T_{setting\ temperature}$ and an outdoor environment temperature $T_{outdoor\ environment}$, as to determine the indoor target temperature of the air conditioner during operation. In the embodiment, a temperature of the outlet air of the air conditioner is different, and accordingly a corresponding alternating current of the air conditioner and/or a phase current of the compressor are/is different. In the embodiment, as an alternative, the setting temperature of the user may be corrected according to the phase current of the compressor, as to determine the indoor target temperature of the air conditioner during operation, and/or the setting temperature of the user may be corrected according to the alternating current of the air conditioner, as to determine the indoor target temperature of the air conditioner during operation.

S30, a frequency of the compressor is adjusted on the basis of the operating environment parameter and the target temperature of the air conditioner and the revolving speed of the internal fan. In the embodiment, the target temperature and the revolving speed of the internal fan may be subjected to closed-loop control, and may be adjusted in real time according to the at least one operating environment parameter of the air conditioner. In the embodiment, the revolving speed of the internal fan may be adjusted in real time, or set by the user. If the revolving speed of the internal fan is adjusted in real time for operation, the revolving speed of the internal fan will be continuously calculated and updated. If the user sets the revolving speed, the revolving speed may be calculated once in a case that entering into the cool feeling mode, and an indoor fan may control an air outlet speed according to the revolving speed of the internal fan. The frequencies of the compressor corresponding to the air outlet speed and the temperature of the outlet air are different. In the embodiment, for adjusting the air outlet speed and the temperature, the frequency of the compressor needs to be controlled according to the at least one operating environment parameter and the target temperature of the air conditioner and the revolving speed of the internal fan. For example, after achieving a first target temperature, the operating environment parameter of the air conditioner is changed, the frequency is subjected to the closed-loop control, and the frequency of the compressor is adjusted in real time according to the at least one operating environment parameter of the air conditioner, as to adjust the target temperature and the revolving speed of the internal fan.

The operating environment parameter of the air conditioner is acquired, the target temperature of the air conditioner and the revolving speed of the internal fan are determined according to the at least one operating environment parameter of the air conditioner, and the frequency of the compressor is adjusted on the basis of the operating environment parameter and the target temperature of the air conditioner and the revolving speed of the internal fan. The air conditioner may have multiple operating environment parameters, and all parameters influencing temperature control of the air conditioner may be considered, in this way temperature control accuracy of the air conditioner may be improved. The frequency of the compressor of the air conditioner is subjected to the closed-loop control according to the at least one operating environment parameter of the air conditioner and according to the target temperature and the revolving speed of the internal fan determined by the environment parameter, in this way a temperature adjusted by the air conditioner may be controlled accurately.

For ensuring the temperature control accuracy of the air conditioner, in an optional embodiment, the target temperature of the air conditioner needs to be adjusted, in this way a first temperature difference between the indoor temperature and a preset temperature of the air conditioner may be calculated, a temperature to be compensated may be determined according to any one of the first temperature difference, the indoor humidity, the outdoor temperature and electric energy consumed by the air conditioner and or any combination thereof, and the target temperature of the air conditioner is obtained on the basis of the temperature to be compensated.

In the embodiment, determination of the temperature determined to be compensated is illustratively described. Specifically, the temperature to be compensated may be determined according to the first temperature difference, herein, a table below may be referred to for a mode of obtaining the temperature to be compensated.

| $\Delta T_0$ | $\Delta T_0 \le \Delta T_{01}$ | $\Delta T_{01} < \Delta T_0 \le \Delta T_{02}$ | $\Delta T_{02} < \Delta T_0 \le \Delta T_{03}$ | $\Delta T_{03} < \Delta T_0 \le \Delta T_{04}$ | $\Delta T_0 > \Delta T_{04}$ |
|---|---|---|---|---|---|
| $T_{to\ be\ compensated}$ | $T_{to\ be\ compensated\ 1}$ | $T_{to\ be\ compensated\ 2}$ | $T_{to\ be\ compensated\ 3}$ | $T_{to\ be\ compensated\ 4}$ | $T_{to\ be\ compensated\ 5}$ |

Where, the $\Delta T_0$ is the first temperature difference, the $T_{to\ be\ compensated}$ is the temperature to be compensated, the $\Delta T_{01}$, the $\Delta T_{02}$, the $\Delta T_{03}$ and the $\Delta T_{04}$ are different value ranges of the $\Delta T_0$, respectively. In the embodiment, the $T_{to\ be\ compensated}$ is a value range of the temperature to be compensated, and may be $-10°$ C.$\sim 5°$ C. Values of the $T_{to\ be\ compensated}$ above are only for illustration, and may be obtained through dividing the $\Delta T_0$ into different temperature sections according to actual need, without being limited to the ones obtained above.

As an alternative, the temperature to be compensated may be determined according to the first temperature difference and the indoor humidity, herein, a table below may be referred to for a mode of obtaining the temperature to be compensated.

| RH | $\Delta T_0$ | | | | |
|---|---|---|---|---|---|
| | $\Delta T_0 \le \Delta T_{01}$ | $\Delta T_{01} < \Delta T_0 \le \Delta T_{02}$ | $\Delta T_{02} < \Delta T_0 \le \Delta T_{03}$ | $\Delta T_{03} < \Delta T_0 \le \Delta T_{04}$ | $\Delta T_0 > \Delta T_0$ |
| $RH \le RH_1$ | $T_{to\ be\ compensated\ 1}$ | $T_{to\ be\ compensated\ 2}$ | $T_{to\ be\ compensated\ 3}$ | $T_{to\ be\ compensated\ 4}$ | $T_{to\ be\ compensated\ 5}$ |
| $RH_1 < RH \le RH_2$ | $T_{to\ be\ compensated\ 1}\text{-}T_{RH1}$ | $T_{to\ be\ compensated\ 2}\text{-}T_{RH1}$ | $T_{to\ be\ compensated\ 3}\text{-}T_{RH1}$ | $T_{to\ be\ compensated\ 4}\text{-}T_{RH1}$ | $T_{to\ be\ compensated\ 5}\text{-}T_{RH1}$ |
| $RH_2 < RH \le RH_3$ | $T_{to\ be\ compensated\ 1}\text{-}T_{RH2}$ | $T_{to\ be\ compensated\ 2}\text{-}T_{RH2}$ | $T_{to\ be\ compensated\ 3}\text{-}T_{RH2}$ | $T_{to\ be\ compensated\ 4}\text{-}T_{RH2}$ | $T_{to\ be\ compensated\ 5}\text{-}T_{RH2}$ |
| $RH_3 < RH \le RH_4$ | $T_{to\ be\ compensated\ 1}\text{-}T_{RH3}$ | $T_{to\ be\ compensated\ 2}\text{-}T_{RH3}$ | $T_{to\ be\ compensated\ 3}\text{-}T_{RH3}$ | $T_{to\ be\ compensated\ 4}\text{-}T_{RH3}$ | $T_{to\ be\ compensated\ 5}\text{-}T_{RH3}$ |
| $RH > RH_4$ | $T_{to\ be\ compensated\ 1}\text{-}T_{RH4}$ | $T_{to\ be\ compensated\ 2}\text{-}T_{RH4}$ | $T_{to\ be\ compensated\ 3}\text{-}T_{RH4}$ | $T_{to\ be\ compensated\ 4}\text{-}T_{RH4}$ | $T_{to\ be\ compensated\ 5}\text{-}T_{RH4}$ |

Where, the $\Delta T_0$ is the first temperature difference, the $T_{to\ be\ compensated}$ is the temperature to be compensated, the $\Delta T_{01}$, the $\Delta T_{02}$, the $\Delta T_{03}$ and the $\Delta T_{04}$ are different value ranges of the $\Delta T_0$, respectively. the $T_{RH1}$ to the $T_{RH4}$ are compensated temperatures respectively corresponding to different humidity, and may be $-2°$ C.$\sim 7°$ C. In the embodiment, the $T_{to\ be\ compensated}$ is the value range of the temperature to be compensated, and may be $-10°$ C.$\sim 5°$ C. Values of the $T_{to\ be\ compensated}$ above are only for illustration, and may be obtained through dividing the $\Delta T_0$ and the RH into different temperature sections according to actual need, without being limited to the ones obtained above.

As an alternative, the temperature to be compensated may be determined according to the outdoor temperature, herein, a table below may be referred to for a mode of obtaining the temperature to be compensated.

| $T_{outdoor\ environment}$ | $T_{outdoor\ environment} \leq T_{outdoor\ environment\ 1}$ | $T_{outdoor\ environment1} < T_{outdoor\ environment} \leq T_{outdoor\ environment\ 2}$ | $T_{outdoor\ environment2} < T_{outdoor\ environment} \leq T_{outdoor\ environment\ 3}$ | $T_{outdoor\ environment3} < T_{outdoor\ environment} \leq T_{outdoor\ environment\ 4}$ | $T_{outdoor\ environment} > T_{outdoor\ environment\ 4}$ |
|---|---|---|---|---|---|
| $T_{to\ be\ compensated}$ | $T_{to\ be\ compensated\ 1}$ | $T_{to\ be\ compensated\ 2}$ | $T_{to\ be\ compensated\ 3}$ | $T_{to\ be\ compensated\ 4}$ | $T_{to\ be\ compensated\ 5}$ |

Where, the $T_{outdoor\ environment}$ is the outdoor temperature, the $T_{outdoor\ environment\ 1}$ to the $T_{outdoor\ environment\ 4}$ are different value ranges of the outdoor temperature, respectively. The $T_{to\ be\ compensated}$ is the value range of the temperature to be compensated, and may be $-10°$ C.$\sim 5°$ C. Values of the $T_{to\ be\ compensated}$ above are only for illustration, and may be obtained through dividing the outdoor temperature $T_{outdoor\ environment}$ into different temperature sections according to actual need, without being limited to the ones obtained above.

As an alternative, the temperature to be compensated may be determined according to the first temperature difference and the outdoor temperature, herein, a table below may be referred to for a mode of obtaining the temperature to be compensated.

$T_{outdoor\ environment\ 4}$ are different value ranges of the external temperature, and the $T_{outdoor\ environment\ compensation}$ is $-2°$ C.$\sim 7°$ C. The $T_{outdoor\ environment\ compensation\ 1}$ to the $T_{outdoor\ environment\ compensation\ 4}$ are different compensation temperatures in a case that the external temperature is from the $T_{outdoor\ environment\ 1}$ to the $T_{outdoor\ environment\ 4}$ and within the value ranges of the $\Delta T_{01}$, the $\Delta T_{02}$, the $\Delta T_{03}$ and the $\Delta T_{04}$. The $T_{to\ be\ compensated}$ is the value range of the temperature to be compensated, and may be $-10°$ C.$\sim 5°$ C. Values of the $T_{to\ be\ compensated}$ above are only for illustration, and may be obtained through dividing the external temperature $T_{outdoor\ environment}$ into different temperature sections according to actual need, without being limited to the ones obtained above.

| | $\Delta T_0$ | | |
|---|---|---|---|
| $T_{outdoor\ environment}$ | $\Delta T_0 \leq \Delta T_{01}$ | $\Delta T_{01} < \Delta T_0 \leq \Delta T_{02}$ | $\Delta T_{02} < \Delta T_0 \leq \Delta T_{03}$ |
| $T_{outdoor\ environment} \leq T_{outdoor\ environment1}$ | $T_{outdoor\ environment\ 1}$ | $T_{outdoor\ environment\ 2}$ | $T_{outdoor\ environment\ 3}$ |
| $T_{outdoor\ environment\ 1} < T_{outdoor\ environment} \leq T_{outdoor\ environment\ 2}$ | $T_{to\ be\ compensated\ 1^-}$ $T_{compensated\ by\ outdoor\ environment\ 1}$ | $T_{to\ be\ compensated\ 2^-}$ $T_{compensated\ by\ outdoor\ environment\ 1}$ | $T_{to\ be\ compensated\ 3^-}$ $T_{compensated\ by\ outdoor\ environment\ 1}$ |
| $T_{outdoor\ environment\ 2} < T_{outdoor\ environment} \leq T_{outdoor\ environment\ 3}$ | $T_{to\ be\ compensated\ 1^-}$ $T_{compensated\ by\ outdoor\ environment\ 2}$ | $T_{to\ be\ compensated\ 2^-}$ $T_{compensated\ by\ outdoor\ environment\ 2}$ | $T_{to\ be\ compensated\ 3^-}$ $T_{compensated\ by\ outdoor\ environment\ 2}$ |
| $T_{outdoor\ environment\ 3} < T_{outdoor\ environment} \leq T_{outdoor\ environment\ 4}$ | $T_{to\ be\ compensated\ 1^-}$ $T_{compensated\ by\ outdoor\ environment\ 3}$ | $T_{to\ be\ compensated\ 2^-}$ $T_{compensated\ by\ outdoor\ environment\ 3}$ | $T_{to\ be\ compensated\ 3^-}$ $T_{compensated\ by\ outdoor\ environment\ 3}$ |
| $T_{outdoor\ environment} > T_{outdoor\ environment\ 4}$ | $T_{to\ be\ compensated\ 1^-}$ $T_{compensated\ by\ outdoor\ environment\ 4}$ | $T_{to\ be\ compensated\ 2^-}$ $T_{compensated\ by\ outdoor\ environment\ 4}$ | $T_{to\ be\ compensated\ 3^-}$ $T_{compensated\ by\ outdoor\ environment\ 4}$ |

| | $\Delta T_0$ | |
|---|---|---|
| $T_{outdoor\ environment}$ | $\Delta T_{03} < \Delta T_0 \leq \Delta T_{04}$ | $\Delta T_0 > \Delta T_{04}$ |
| $T_{outdoor\ environment} \leq T_{outdoor\ environment1}$ | $T_{outdoor\ environment\ 4}$ | $T_{outdoor\ environment\ 5}$ |
| $T_{outdoor\ environment\ 1} < T_{outdoor\ environment} \leq T_{outdoor\ environment\ 2}$ | $T_{to\ be\ compensated\ 4^-}$ $T_{compensated\ by\ outdoor\ environment\ 1}$ | $T_{to\ be\ compensated\ 5^-}$ $T_{compensated\ by\ outdoor\ environment\ 1}$ |
| $T_{outdoor\ environment\ 2} < T_{outdoor\ environment} \leq T_{outdoor\ environment\ 3}$ | $T_{to\ be\ compensated\ 4^-}$ $T_{compensated\ by\ outdoor\ environment\ 2}$ | $T_{to\ be\ compensated\ 5^-}$ $T_{compensated\ by\ outdoor\ environment\ 2}$ |
| $T_{outdoor\ environment\ 3} < T_{outdoor\ environment} \leq T_{outdoor\ environment\ 4}$ | $T_{to\ be\ compensated\ 4^-}$ $T_{compensated\ by\ outdoor\ environment\ 3}$ | $Tt_{o\ be\ compensated\ 5^-}$ $T_{compensated\ by\ outdoor\ environment\ 3}$ |
| $T_{outdoor\ environment} > T_{outdoor\ environment\ 4}$ | $T_{to\ be\ compensated\ 4^-}$ $T_{compensated\ by\ outdoor\ environment\ 4}$ | $T_{to\ be\ compensated\ 5^-}$ $T_{compensated\ by\ outdoor\ environment\ 4}$ |

Where, the $\Delta T_0$ is the first temperature difference, the $T_{to\ be\ compensated}$ is the temperature to be compensated, the $\Delta T_{01}$, the $\Delta T_{02}$, the $\Delta T_{03}$ and the $\Delta T_{04}$ are different value ranges of the $\Delta T_0$, respectively. The $T_{outdoor\ environment}$ is the external temperature, the $T_{outdoor\ environment\ 1}$ to the As an alternative, the temperature to be compensated may be determined according to the phase current of the compressor, herein, the larger the phase current of the compressor is, the heavier a load of the air conditioner may be, herein, a table below may be referred to for a mode of obtaining the temperature to be compensated.

| $I_{phase}$ | $I_{phase} \leq I_{phase1}$ | $I_{phase1} < I_{phase} \leq I_{phase2}$ | $I_{phase2} < I_{phase} \leq I_{phase3}$ | $I_{phase3} < I_{phase} \leq I_{phase4}$ | $I_{phase} > I_{phase4}$ |
|---|---|---|---|---|---|
| $T_{to\ be\ compensated}$ | $T_{to\ be\ compensated\ 1}$ | $T_{to\ be\ compensated\ 2}$ | $T_{to\ be\ compensated\ 3}$ | $T_{to\ be\ compensated\ 4}$ | $T_{to\ be\ compensated\ 5}$ |

Herein, values of the $T_{to\ be\ compensated}$ above are only for illustration, and may be obtained through dividing the phase current $I_{phase}$ into different current sections according to actual need, without being limited to the ones obtained above.

As an alternative, the temperature to be compensated may be determined according to an alternating current (AC) of the air conditioner, the larger the phase current of the compressor is, the heavier a load of the air conditioner may be, herein, a table below may be referred to for a mode of obtaining the temperature to be compensated.

| $I_{AC}$ | $I_{AC} \leq I_{AC1}$ | $I_{AC1} < I_{AC} \leq I_{AC2}$ | $I_{AC2} < I_{AC} \leq I_{AC3}$ | $I_{AC3} < I_{AC} \leq I_{AC4}$ | $I_{AC} > I_{AC4}$ |
|---|---|---|---|---|---|
| $T_{to\ be\ compensated}$ | $T_{to\ be\ compensated\ 5}$ | $T_{to\ be\ compensated\ 4}$ | $T_{to\ be\ compensated\ 3}$ | $T_{to\ be\ compensated\ 2}$ | $T_{to\ be\ compensated\ 1}$ |

The values of the $T_{to\ be\ compensated}$ above are only for illustration, and may be obtained through dividing the $I_{AC}$ into different current sections according to actual need, without being limited to the ones obtained above.

A factor of acquiring the $T_{to\ be\ compensated}$ may be any combination of the indoor environment temperature $T_{indoor\ environment}$, the indoor humidity RH, the setting temperature $T_{setting\ temperature}$, the $T_{outdoor\ environment}$, the $I_{phase}$, the $I_{AC}$ and other factors, and a concept of acquiring the value thereof is similar to that of the abovementioned method, and will not be elaborated herein.

For ensuring the temperature control accuracy of the air conditioner, in an optional embodiment, the revolving speed of the internal fan needs to be adjusted, the first temperature difference between the indoor temperature and the preset temperature of the air conditioner needs to be calculated, a revolving speed to be compensated needs to be determined according to any one of the first temperature difference, the indoor humidity, the outdoor temperature or the electric energy consumed by the air conditioner or any combination thereof, and the revolving speed of the internal fan is obtained according to the revolving speed to be compensated and a preset revolving speed. In a specific embodiment, the user may set the revolving speed of the fan, and the revolving speed of the internal fan is set in a case that the user sets the revolving speed of the internal fan according to the at least one operating environment parameter of the air conditioner, $Rpm_{internal\ fan} = Rpm_{setting\ air\ gear} + Rpm_{to\ be\ compensated}$, where, $Rpm_{to\ be\ compensated} \in [0, 500\ rpm]$.

In a case that the revolving speed of the internal fan is determined, the revolving speed of the internal fan remains unchanged. In the embodiment, a mode of determining the revolving speed of the internal fan is shown exemplarily, specifically, the revolving speed of the internal fan may be determined according to the first temperature difference. Moreover, a table below may be referred to for a mode of obtaining the revolving speed to be compensated.

| $\Delta T_0$ | $\Delta T_0 \leq \Delta T_{01}$ | $\Delta T_{01} < \Delta T_0 \leq \Delta T_{02}$ | $\Delta T_{02} < \Delta T_0 \leq \Delta T_{03}$ | $\Delta T_{03} < \Delta T_0 \leq \Delta T_{04}$ | $\Delta T_0 > \Delta T_{04}$ |
|---|---|---|---|---|---|
| $Rpm_{to\ be\ compensated}$ | $Rpm_{to\ be\ compensated\ 1}$ | $Rpm_{to\ be\ compensated\ 2}$ | $Rpm_{to\ be\ compensated\ 3}$ | $Rpm_{to\ be\ compensated\ 4}$ | $Rpm_{to\ be\ compensated\ 5}$ |

Herein, values of the $Rpm_{to\ be\ compensated}$ above are only for illustration, and may be obtained through dividing the $\Delta T_0$ into different temperature sections according to actual need, without being limited to the ones obtained above.

As an alternative, the revolving speed to be compensated may be determined according to the first temperature difference and the indoor humidity, and a table below may be referred to for a mode of obtaining the revolving speed to be compensated.

| RH | $\Delta T_0$ | | | | |
|---|---|---|---|---|---|
| | $\Delta T_0 \leq \Delta T_{01}$ | $\Delta T_{01} < \Delta T_0 \leq \Delta T_{02}$ | $\Delta T_{02} < \Delta T_0 \leq \Delta T_{03}$ | $\Delta T_{03} < \Delta T_0 \leq \Delta T_{04}$ | $\Delta T_0 > \Delta T_{04}$ |
| $RH \leq RH_1$ | $Rpm_{to\ be\ compensated\ 1}$ | $Rpm_{to\ be\ compensated\ 2}$ | $Rpm_{to\ be\ compensated\ 3}$ | $Rpm_{to\ be\ compensated\ 4}$ | $Rpm_{to\ be\ compensated\ 5}$ |
| $RH_1 < RH \leq RH_2$ | $Rpm_{to\ be\ compensated\ 1} + Rpm_{RH\ 1}$ | $Rpm_{to\ be\ compensated\ 2} + Rpm_{RH1}$ | $Rpm_{to\ be\ compensated\ 3} + Rpm_{RH1}$ | $Rpm_{to\ be\ compensated\ 4} + Rpm_{RH1}$ | $Rpm_{to\ be\ compensated\ 5} + Rpm_{RH1}$ |
| $RH_2 < RH \leq RH_3$ | $Rpm_{to\ be\ compensated\ 1} + Rpm_{RH\ 2}$ | $Rpm_{to\ be\ compensated\ 2} + Rpm_{RH\ 2}$ | $Rpm_{to\ be\ compensated\ 3} + Rpm_{RH\ 2}$ | $Rpm_{to\ be\ compensated\ 4} + Rpm_{RH\ 2}$ | $Rpm_{to\ be\ compensated\ 5} + Rpm_{RH2}$ |
| $RH_3 < RH \leq RH_4$ | $Rpm_{to\ be\ compensated\ 1} + Rpm_{RH\ 3}$ | $Rpm_{to\ be\ compensated\ 2} + Rpm_{RH\ 3}$ | $Rpm_{to\ be\ compensated\ 3} + Rpm_{RH\ 3}$ | $Rpm_{to\ be\ compensated\ 4} + Rpm_{RH\ 3}$ | $Rpm_{to\ be\ compensated\ 5} + Rpm_{RH3}$ |
| $RH > RH_4$ | $Rpm_{to\ be\ compensated\ 1} + Rpm_{RH\ 4}$ | $Rpm_{to\ be\ compensated\ 2} + Rpm_{RH\ 4}$ | $Rpm_{to\ be\ compensated\ 3} + Rpm_{RH\ 4}$ | $Rpm_{to\ be\ compensated\ 4} + Rpm_{RH\ 4}$ | $Rpm_{to\ be\ compensated\ 5} + Rpm_{RH4}$ |

Herein, values of the $Rpm_{to\ be\ compensated}$ above are only for illustration, and may be obtained through dividing the $\Delta T_0$ and RH into different temperature sections according to actual need, without being limited to the ones obtained above.

$Rpm_{RH} = \{Rpm_{RH\ 1}, Rpm_{RH\ 2}, Rpm_{RH\ 3}, Rpm_{RH\ 4}\}$, $Rpm_{RH} \in [0, 200\ rpm]$ As an alternative, the revolving speed to be compensated may be determined according to the outdoor temperature, specifically, a table below may be referred to for a mode of obtaining the revolving speed to be compensated.

| $T_{outdoor\ environment}$ | $T_{outdoor\ environment} \leq T_{outdoor\ environment\ 1}$ | $T_{outdoor\ environment\ 1} < T_{outdoor\ environment} \leq T_{outdoor\ environment\ 2}$ | $T_{outdoor\ environment\ 2} < T_{outdoor\ environment} \leq T_{outdoor\ environment\ 3}$ | $T_{outdoor\ environment\ 3} < T_{outdoor\ environment} \leq T_{outdoor\ environment\ 4}$ | $T_{outdoor\ environment} > T_{outdoor\ environment\ 4}$ |
|---|---|---|---|---|---|
| $Rpm_{to\ be\ compensated}$ | $Rpm_{to\ be\ compensated\ 1}$ | $Rpm_{to\ be\ compensated\ 2}$ | $Rpm_{to\ be\ compensated\ 3}$ | $Rpm_{to\ be\ compensated\ 4}$ | $Rpm_{to\ be\ compensated\ 5}$ |

Herein, values of the $Rpm_{to\ be\ compensated}$ above are only for illustration, and may be obtained through dividing the outdoor environment temperature into different temperature sections according to actual need, without being limited to the ones obtained above.

As an alternative, the revolving speed to be compensated may be determined according to the first temperature difference and the outdoor temperature, specifically, a table below may be referred to for a mode of obtaining the revolving speed to be compensated.

$Rpm_{outdoor\ environment} = \{Rpm_{outdoor\ environment\ 1}, Rpm_{outdoor\ environment\ 2}, Rpm_{outdoor\ environment\ 3}, Rpm_{outdoor\ environment\ 4}\}$, $Rpm_{outdoor\ environment} \in [0, 200\ rpm]$.

In the embodiment, as an alternative, the revolving speed to be compensated may be determined according to the first temperature difference, the indoor humidity and the outdoor temperature, or determined according to the electric energy consumed by the air conditioner, and may be obtained with a method similar to that of the abovementioned method. The abovementioned method for obtaining the revolving speed or temperature to be compensated may be referred to, and will not be elaborated herein.

For ensuring the temperature control accuracy of the air conditioner, in an optional embodiment, the revolving speed of the internal fan needs to be adjusted, the first temperature difference between the indoor temperature and the preset temperature of the air conditioner is calculated, and the revolving of the internal fan may be determined according to any one of the first temperature difference, the indoor humidity, the outdoor temperature and the electric energy

| $T_{outdoor\ environment}$ | $\Delta T_0$ | | | | |
|---|---|---|---|---|---|
| | $\Delta T_0 \leq \Delta T_{01}$ | $\Delta T_{01} < \Delta T_0 \leq \Delta T_{02}$ | $\Delta T_{02} < \Delta T_0 \leq \Delta T_{03}$ | $\Delta T_{03} < \Delta T_0 \leq \Delta T_{04}$ | $\Delta T_0 > \Delta T_{04}$ |
| $T_{outdoor\ environment} \leq T_{outdoor\ environment\ 1}$ | $Rpm_{to\ be\ compensated\ 1}$ | $Rpm_{to\ be\ compensated\ 2}$ | $Rpm_{to\ be\ compensated\ 3}$ | $Rpm_{to\ be\ compensated\ 4}$ | $Rpm_{to\ be\ compensated\ 5}$ |
| $T_{outdoor\ environment\ 1} < T_{outdoor\ environment} \leq T_{outdoor\ environment\ 2}$ | $Rpm_{to\ be\ compensated\ 1} + Rpm_{outdoor\ environment\ 1}$ | $Rpm_{to\ be\ compensated\ 2} + Rpm_{outdoor\ environment\ 1}$ | $Rpm_{to\ be\ compensated\ 3} + Rpm_{outdoor\ environment\ 1}$ | $Rpm_{to\ be\ compensated\ 4} + Rpm_{outdoor\ environment\ 1}$ | $Rpm_{to\ be\ compensated\ 5} + Rpm_{outdoor\ environment\ 1}$ |
| $T_{outdoor\ environment\ 2} < T_{outdoor\ environment} \leq T_{outdoor\ environment\ 3}$ | $Rpm_{to\ be\ compensated\ 1} + Rpm_{outdoor\ environment\ 2}$ | $Rpm_{to\ be\ compensated\ 2} + Rpm_{outdoor\ environment\ 2}$ | $Rpm_{to\ be\ compensated\ 3} + Rpm_{outdoor\ environment\ 2}$ | $Rpm_{to\ be\ compensated\ 4} + Rpm_{outdoor\ environment\ 2}$ | $Rpm_{to\ be\ compensated\ 5} + Rpm_{outdoor\ environment\ 2}$ |
| $T_{outdoor\ environment\ 3} < T_{outdoor\ environment} \leq T_{outdoor\ environment\ 4}$ | $Rpm_{to\ be\ compensated\ 1} + Rpm_{outdoor\ environment\ 3}$ | $Rpm_{to\ be\ compensated\ 2} + Rpm_{outdoor\ environment\ 3}$ | $Rpm_{to\ be\ compensated\ 3} + Rpm_{outdoor\ environment\ 3}$ | $Rpm_{to\ be\ compensated\ 4} + Rpm_{outdoor\ environment\ 3}$ | $Rpm_{to\ be\ compensated\ 5} + Rpm_{outdoor\ environment\ 3}$ |
| $T_{outdoor\ environment} > T_{outdoor\ environment\ 4}$ | $Rpm_{to\ be\ compensated\ 1} + Rpm_{outdoor\ environment\ 4}$ | $Rpm_{to\ be\ compensated\ 2} + Rpm_{outdoor\ environment\ 4}$ | $Rpm_{to\ be\ compensated\ 3} + Rpm_{outdoor\ environment\ 4}$ | $Rpm_{to\ be\ compensated\ 4} + Rpm_{outdoor\ environment\ 4}$ | $Rpm_{to\ be\ compensated\ 5} + Rpm_{outdoor\ environment\ 4}$ |

Values of the $Rpm_{to\ be\ compensated}$ above are only for illustration, and may be obtained through dividing the $\Delta T_0$ and the $T_{outdoor\ environment}$ into different temperature sections according to actual need, without being limited to the ones obtained above and a relationship thereof.

consumed by the air conditioner or any combination thereof. In a specific embodiment, the revolving speed of the internal fan is automatically adjusted, the revolving speed of the internal fan needs to be adjusted in real time according to the at least one operating environment parameter of the air conditioner, specifically, the revolving of the internal fan may be determined according to the first temperature difference. Specifically, a table below may be referred to for a method for obtaining the revolving speed of the internal fan.

| $\Delta T_0$ | $\Delta T_0 \leq \Delta T_{01}$ | $\Delta T_{01} < \Delta T_0 \leq \Delta T_{02}$ | $\Delta T_{02} < \Delta T_0 \leq \Delta T_{03}$ | $\Delta T_{03} < \Delta T_0 \leq \Delta T_{04}$ | $\Delta T_0 > \Delta T_{04}$ |
|---|---|---|---|---|---|
| $Rpm_{internal\ fan}$ | $Rpm_{internal\ fan\ 1}$ | $Rpm_{internal\ fan\ 2}$ | $Rpm_{internal\ fan\ 3}$ | $Rpm_{internal\ fan\ 4}$ | $Rpm_{internal\ fan\ 5}$ |

Herein, values of the $Rpm_{internal\ fan}$ above are only for illustration, and may be obtained through dividing the $\Delta T_0$ into different temperature sections according to actual need, without being limited to the ones obtained above.

As an alternative, the revolving speed of the internal fan may be determined according to the first temperature difference and the indoor humidity, specifically, a table below may be referred to for a mode of obtaining the revolving speed to be compensated.

| | $\Delta T_0$ | | | | |
|---|---|---|---|---|---|
| RH | $\Delta T_0 \leq \Delta T_{01}$ | $\Delta T_{01} < \Delta T_0 \leq \Delta T_{02}$ | $\Delta T_{02} < \Delta T_0 \leq \Delta T_{03}$ | $\Delta T_{03} < \Delta T_0 \leq \Delta T_{04}$ | $\Delta T_0 > \Delta T_{04}$ |
| $RH \leq RH_1$ | $Rpm_{internal\ fan\ 1}$ | $Rpm_{internal\ fan\ 2}$ | $Rpm_{internal\ fan\ 3}$ | $Rpm_{internal\ fan\ 4}$ | $Rpm_{internal\ fan\ 5}$ |
| $RH_1 < RH \leq RH_2$ | $Rpm_{internal\ fan\ 1} + Rpm_{RH1}$ | $Rpm_{internal\ fan\ 2} + Rpm_{RH1}$ | $Rpm_{internal\ fan\ 3} + Rpm_{RH1}$ | $Rpm_{internal\ fan\ 4} + Rpm_{RH1}$ | $Rpm_{internal\ fan\ 5} + Rpm_{RH1}$ |
| $RH_2 < RH < RH_3$ | $Rpm_{internal\ fan\ 1} + Rpm_{RH\ 2}$ | $Rpm_{internal\ fan\ 2} + Rpm_{RH\ 2}$ | $Rpm_{internal\ fan\ 3} + Rpm_{RH\ 2}$ | $Rpm_{internal\ fan\ 4} + Rpm_{RH\ 2}$ | $Rpm_{internal\ fan\ 5} + Rpm_{RH2}$ |
| $RH_3 < RH \leq RH_4$ | $Rpm_{internal\ fan\ 1} + Rpm_{RH\ 3}$ | $Rpm_{internal\ fan\ 2} + Rpm_{RH\ 3}$ | $Rpm_{internal\ fan\ 3} + Rpm_{RH\ 3}$ | $Rpm_{internal\ fan\ 4} + Rpm_{RH\ 3}$ | $Rpm_{internal\ fan\ 5} + Rpm_{RH3}$ |
| $RH > RH_4$ | $Rpm_{internal\ fan\ 1} + Rpm_{RH\ 4}$ | $Rpm_{internal\ fan\ 2} + Rpm_{RH\ 4}$ | $Rpm_{internal\ fan\ 3} + Rpm_{RH\ 4}$ | $Rpm_{internal\ fan\ 4} + Rpm_{RH\ 4}$ | $Rpm_{internal\ fan\ 5} + Rpm_{RH4}$ |

Herein, values of the $Rpm_{internal\ fan}$ above are only for illustration, and may be obtained through dividing the $\Delta T_0$ and RH into different temperature sections according to actual need, without being limited to the ones obtained above and a relationship thereof.

$Rpm_{RH} = \{Rpm_{RH\ 1}, Rpm_{RH\ 2}, Rpm_{RH\ 3}, Rpm_{RH\ 4}\}$, $Rpm_{RH} \in [0, 200\ rpm]$.

As an alternative, the revolving speed of the internal fan may be determined according to the outdoor temperature, specifically, a table below may be referred to for a mode of obtaining the revolving speed to be compensated.

| $T_{outdoor\ environment}$ | $T_{outdoor\ environment} \leq T_{outdoor\ environment\ 1}$ | $T_{outdoor\ environment\ 1} < T_{outdoor\ environment} \leq T_{outdoor\ environment\ 2}$ | $T_{outdoor\ environment\ 2} < T_{outdoor\ environment} \leq T_{outdoor\ environment\ 3}$ | $T_{outdoor\ environment\ 3} < T_{outdoor\ environment} \leq T_{outdoor\ environment\ 4}$ | $T_{outdoor\ environment} > T_{outdoor\ environment\ 4}$ |
|---|---|---|---|---|---|
| $Rpm_{internal\ fan}$ | $Rpm_{internal\ fan\ 1}$ | $Rpm_{internal\ fan\ 2}$ | $Rpm_{internal\ fan\ 3}$ | $Rpm_{internal\ fan\ 4}$ | $Rpm_{internal\ fan\ 5}$ |

Note:
values of the $Rpm_{internal\ fan}$ above are only for illustration, and may be obtained through dividing the outdoor environment temperature into different temperature sections according to actual need, without being limited to the ones obtained above.

As an alternative, the revolving speed of the internal fan may be determined according to the first temperature difference and the outdoor temperature, specifically, a table below may be referred to for a mode of obtaining the revolving speed to be compensated.

| $T_{outdoor\ environment}$ | $\Delta T_0$ | | | | |
|---|---|---|---|---|---|
| | $\Delta T_0 \leq \Delta T_{01}$ | $\Delta T_{01} < \Delta T_0 \leq \Delta T_{02}$ | $\Delta T_{02} < \Delta T_0 \leq \Delta T_{03}$ | $\Delta T_{03} < \Delta T_0 \leq \Delta T_{04}$ | $\Delta T_0 > \Delta T_{04}$ |
| $T_{outdoor\ environment} \leq T_{outdoor\ environment\ 1}$ | $Rpm_{internal\ fan\ 1}$ | $Rpm_{internal\ fan\ 2}$ | $Rpm_{internal\ fan\ 3}$ | $Rpm_{internal\ fan\ 4}$ | $Rpm_{internal\ fan\ 5}$ |
| $T_{outdoor\ environment\ 1} < T_{outdoor\ environment} \leq T_{outdoor\ environment\ 2}$ | $Rpm_{internal\ fan\ 1} + Rpm_{outdoor\ environment\ 1}$ | $Rpm_{internal\ fan\ 2} + Rpm_{outdoor\ environment\ 1}$ | $Rpm_{internal\ fan\ 3} + Rpm_{outdoor\ environment\ 1}$ | $Rpm_{internal\ fan\ 4} + Rpm_{outdoor\ environment\ 1}$ | $Rpm_{internal\ fan\ 5} + Rpm_{outdoor\ environment\ 1}$ |
| $T_{outdoor\ environment\ 2} < T_{outdoor\ environment} \leq T_{outdoor\ environment\ 3}$ | $Rpm_{internal\ fan\ 1} + Rpm_{outdoor\ environment\ 2}$ | $Rpm_{internal\ fan\ 2} + Rpm_{outdoor\ environment\ 2}$ | $Rpm_{internal\ fan\ 3} + Rpm_{outdoor\ environment\ 2}$ | $Rpm_{internal\ fan\ 4} + Rpm_{outdoor\ environment\ 2}$ | $Rpm_{internal\ fan\ 5} + Rpm_{outdoor\ environment\ 2}$ |
| $T_{outdoor\ environment\ 3} < T_{outdoor\ environment} \leq T_{outdoor\ environment\ 4}$ | $Rpm_{internal\ fan\ 1} + Rpm_{outdoor\ environment\ 3}$ | $Rpm_{internal\ fan\ 2} + Rpm_{outdoor\ environment\ 3}$ | $Rpm_{internal\ fan\ 3} + Rpm_{outdoor\ environment\ 3}$ | $Rpm_{internal\ fan\ 4} + Rpm_{outdoor\ environment\ 3}$ | $Rpm_{internal\ fan\ 5} + Rpm_{outdoor\ environment\ 3}$ |
| $T_{outdoor\ environment} > T_{outdoor\ environment\ 4}$ | $Rpm_{internal\ fan\ 1} + Rpm_{outdoor\ environment\ 4}$ | $Rpm_{internal\ fan\ 2} + Rpm_{outdoor\ environment\ 4}$ | $Rpm_{internal\ fan\ 3} + Rpm_{outdoor\ environment\ 4}$ | $Rpm_{internal\ fan\ 4} + Rpm_{outdoor\ environment\ 4}$ | $Rpm_{internal\ fan\ 5} + Rpm_{outdoor\ environment\ 4}$ |

Note:
a) Values of the $Rpm_{internal\ fan}$ above are only for illustration, and may be obtained through dividing the $\Delta T_0$ and $T_{outdoor\ environment}$ into different temperature sections according to actual need, without being limited to the ones obtained above and a relationship thereof.

$Rpm_{outdoor\ environment} = \{Rpm_{outdoor\ environment\ 1}, Rpm_{outdoor\ environment\ 2}, Rpm_{outdoor\ environment\ 3}, Rpm_{outdoor\ environment\ 4}\}$, $Rpm_{outdoor\ environment} \in [0, 200\ rpm]$.

An operating environment of the air conditioner changes in real time. For ensuring the temperature control accuracy of the air conditioner, in an optional embodiment, there are multiple target temperatures of the air conditioner. A current target temperature of the air conditioner needs to be adjusted according to a last target temperature and is related to a cooling rate, and a cooling rate of achieving the last target temperature of the air conditioner is acquired. A current temperature to be compensated is obtained according to the cooling rate, and the current target temperature of the air conditioner is obtained on the basis of the current temperature to be compensated.

A frequency of adjusting the temperature again is ensured to be equivalent or improved, and a refrigerating effect and refrigerating comfort are satisfied preferably. A table below may be referred to for the current temperature to be compensated.

| $\Delta T_0$ | | $D(\Delta T)/D(t) \leq a_1$ | $a_1 < D(\Delta T)/D(t) \leq a_2$ | $a_2 < D(\Delta T)/D(t) \leq a_3$ |
|---|---|---|---|---|
| $T_{to\ be\ compensated\ currently\ 0}$ | | $T_{to\ be\ compensated\ currently\ 01}$ | $T_{to\ be\ compensated\ currently\ 02}$ | $T_{to\ be\ compensated\ currently\ 03}$ |
| | $\Delta T_0$ | $a_3 < D(\Delta T)/D(t) \leq a_4$ | $D(\Delta T)/D(t) > a_4$ | |
| $T_{to\ be\ compensated\ currently\ 0}$ | | $T_{to\ be\ compensated\ currently\ 04}$ | $T_{to\ be\ compensated\ currently\ 05}$ | |

Note:
$D(\Delta T)/D(t)$ may represent a variation of the $\Delta T$ within certain time, as an alternative, represent time required by $\Delta T$ changing for a certain amount, and may be determined according to a design purpose.

$T_{to\ be\ compensated\ currently\ 0} = \{T_{to\ be\ compensated\ currently\ 01}, T_{to\ be\ compensated\ currently\ 02}, T_{to\ be\ compensated\ currently\ 03}, T_{to\ be\ compensated\ currently\ 04}\}$, and each parameter in a sequence may have a certain proportional relation or other data relations.

In an optional embodiment, it is determined that the target temperature of the air conditioner and a target revolving speed of the internal fan are adjusted according to the cool feeling mode of the air conditioner. In the embodiment, before the target temperature of the air conditioner and the target revolving speed of the internal fan are determined according to the at least one operating environment parameter of the air conditioner, the method may further include: the air conditioner is controlled to enter into the cool feeling mode. Refrigerating comfort of the air conditioner is of importance to the human body, especially a cooling rate and the temperature of the outlet air may bring the user practical benefits, and the user may feel cool due to the air conditioner. In the embodiment, the cool feeling mode is an operating mode in which the outlet air of the air conditioner makes the human body feel cool, and is capable of making a room rapidly cooled and ensuring the human body feel comfortable. With the adoption of the cool feeling mode, comfort of the user is improved, and the comfort of the air conditioner and the temperature control accuracy are ensured at the same time.

Figure 2:
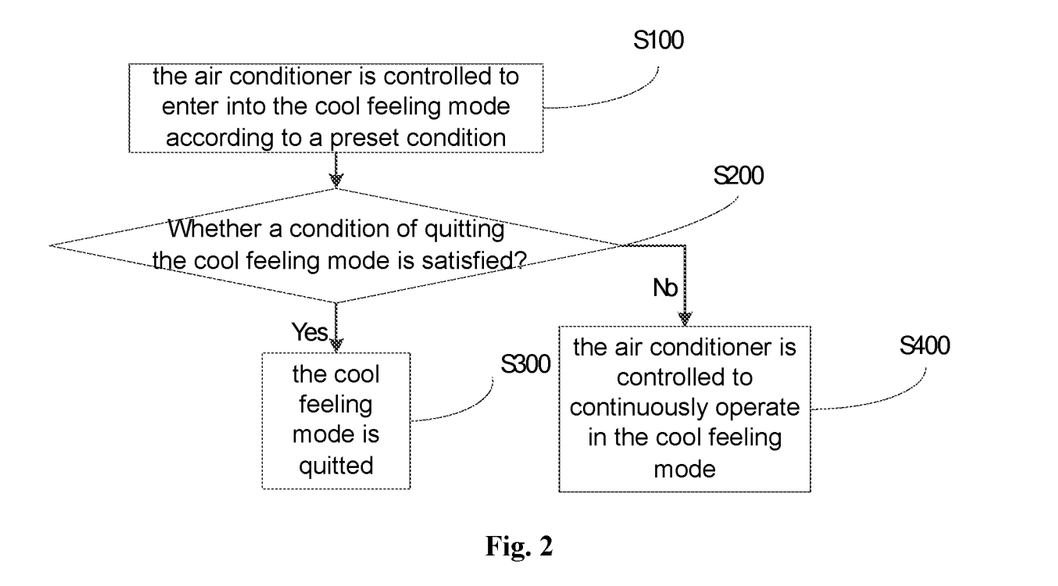
FIG. 2 is a schematic diagram of a method for controlling an air conditioner of an embodiment of the present disclosure in a cool feeling mode.

In an optional embodiment, a mode for the air conditioner to enter into or quit the cool feeling mode may be shown in FIG. 2.

S100, the air conditioner is controlled to enter into the cool feeling mode according to a preset condition.

S200, that whether a condition of quitting the cool feeling mode is satisfied is judged. In a case that the quitting condition is satisfied, it enters into Step S300. In a case that the quitting condition is not satisfied, it enters into Step S400.

S300, the cool feeling mode is quitted.

S400, the air conditioner is controlled to continuously operate in the cool feeling mode.

In the embodiment, in the Step S100 that the air conditioner is controlled to enter into the cool feeling mode according to the preset condition, there may be multiple preset conditions. The air conditioner may enter into the cool feeling mode after receiving a cool feeling control signal for characterizing to control the air conditioner to enter into the cool feeling mode upon being started, and the cool feeling control signal may be an instruction which is sent by the user through triggering a remote controller of the air conditioner or a single button or a combined button on an air conditioner body and characterizes to control the air conditioner to enter into the cool feeling mode. The user may send the cool feeling control signal through triggering a button within a short period of time after starting the air conditioner, as an alternative, may send the cool feeling control signal through triggering the button in a case that the air conditioner operates for a period of time.

Figure 3:
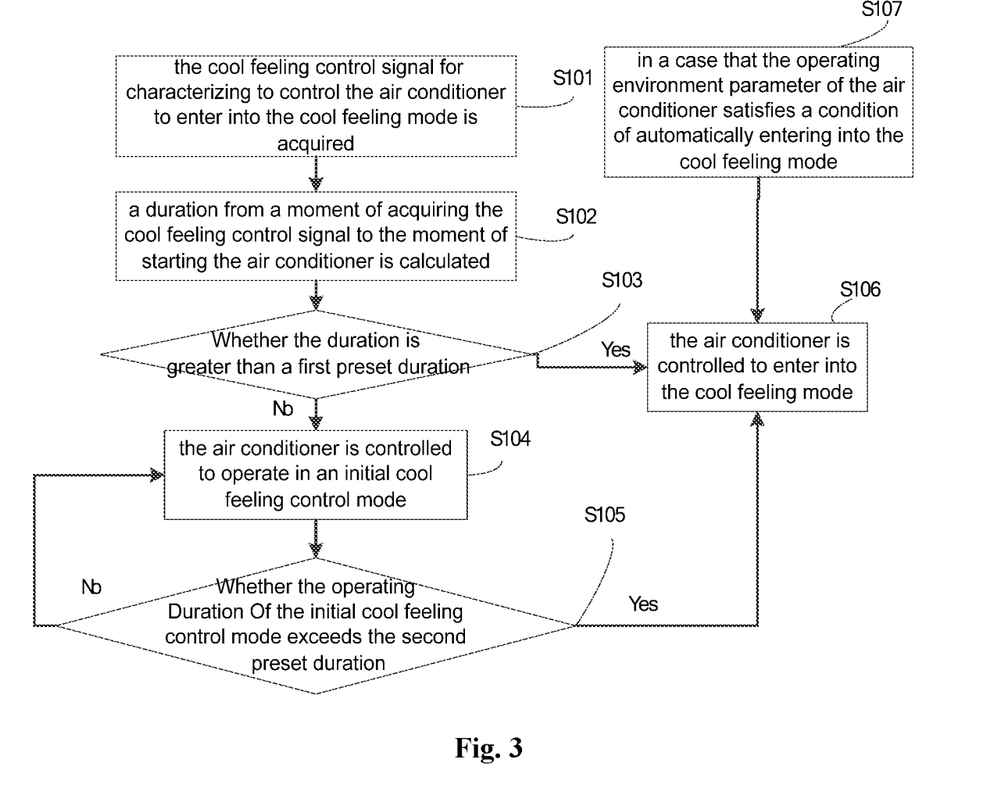
FIG. 3 is a schematic diagram of a method for an air conditioner of an embodiment of the present disclosure to enter into a cool feeling mode.

Specifically, as shown in FIG. 3, the Step S100 may include the following steps.

S101, the cool feeling control signal for characterizing to control the air conditioner to enter into the cool feeling mode is acquired.

S102, a duration from a moment of acquiring the cool feeling control signal to the moment of starting the air conditioner is calculated. In the embodiment, the duration is the one from a recorded movement of starting the air conditioner to the movement of acquiring the cool feeling control signal.

S103, that whether the duration is greater than a first preset duration is judged. In a case that the duration is less than the first preset duration, it enters into Step S104.

S104, the air conditioner is controlled to operate in an initial cool feeling control mode. The initial cool feeling control mode is to determine an initial revolving speed of the internal fan according to the at least one operating environment parameter of the air conditioner, and control the compressor to operate at a maximum frequency according to the initial revolving speed of the internal fan and/or the target temperature of the air conditioner. The compressor operates at the maximum frequency, namely, the compressor implements refrigeration at maximum power achievable by the compressor. An operating duration of the air conditioner in the initial cool feeling control mode is counted, namely, the duration that the compressor operates at the maximum frequency. The indoor temperature may be quickly reduced during a second preset duration that the compressor operates in the initial cool feeling control mode.

S105, that whether the operating duration of the initial cool feeling control mode exceeds the second preset duration is judged. In a case that the operating duration of the initial cool feeling control mode exceeds the second preset duration, it enters into the Step S106. In a case that the operating duration of the initial cool feeling control mode is less than the second preset duration, it enters into the Step S104.

S106, the air conditioner is controlled to enter into the cool feeling mode.

In the embodiment, in a case that the air conditioner is started to operate for a period of time, and in a case that the cooling rate is slow because the load of the air conditioner is great due to opening of a window or a high indoor temperature, as shown in FIG. 3, the Step S100 may further include the following steps.

S107, in a case that the operating environment parameter of the air conditioner satisfies a condition of automatically entering into the cool feeling mode, it enters into the Step S106. Specifically, that whether the outdoor temperature exceeds a first preset value is judged. In a case that the outdoor temperature exceeds the first preset value, and a second temperature difference between the indoor temperature and the target temperature of the air conditioner is calculated. That whether a duration of the second temperature difference exceeding a second preset value exceeds a third preset duration is judged. In a case that the duration of the second temperature difference exceeding the second preset value exceeds the third preset duration, the air conditioner is controlled to enter into the cool feeling mode. In the embodiment, the air conditioner automatically entering into the cool feeling mode may be characterized in that the air conditioner enters into the cool feeling mode in a case that judged to satisfy a condition of automatically entering into the cool feeling mode after the air conditioner is started to operate for a period of time. As an alternative, the air conditioner may enter into the cool feeling mode at any time in a case that judged to satisfy the condition of automatically entering into the cool feeling mode.

For ensuring the temperature control accuracy of the air conditioner and ensuring the comfort of the user, the air conditioner may quit the cool feeling mode in a case that the indoor temperature is suitable, or the user does not need to adjust the temperature. In an optional embodiment, that whether the second temperature difference is less than the third preset value is judged. In a case that the second temperature difference is less than the third preset value, the air conditioner is controlled to quit the cool feeling mode. In the embodiment, as an alternative, the air conditioner may quit the cool feeling mode through detecting the temperature of the outlet air or a temperature of an internal pipe. Specifically, that whether the temperature of the outlet air is less than a fourth preset value is judged. In a case that the temperature of the outlet air is less than the fourth preset value, the air conditioner is controlled to quit the cool feeling mode. And/or, whether the temperature of the internal pipe is less than a fifth preset value is judged. In a case that the temperature of the internal pipe is less than the fifth preset value, the air conditioner is controlled to quit the cool feeling mode.

For avoiding occurrence of a transient event, if the temperature is too low because the temperature of the outlet air or the temperature of the internal pipe is suddenly changed and the like, in the embodiment, that whether a duration of the temperature of the outlet air less than the fourth preset value exceeds the fourth preset value may be judged. In a case that the duration of the temperature of the outlet air less than the fourth preset value exceeds the fourth preset value, the air conditioner is controlled to quit the cool feeling mode. And/or, that whether a duration of the temperature of the internal pipe less than the fifth preset value exceeds the fifth preset value is judged. In a case that the duration of the temperature of the internal pipe less than the fifth preset value exceeds the fifth preset value, the air conditioner is controlled to quit the cool feeling mode.

The user may further control the air conditioner to quit the cool feeling mode according to his own demand. Specifically, a stop signal of characterizing to control the air conditioner to quit the cool feeling mode is acquired, and the air conditioner is controlled to quit the cool feeling mode on the basis of the stop signal.

Figure 4:
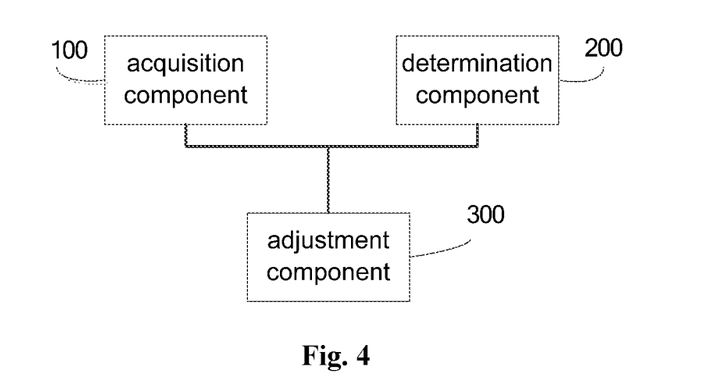
FIG. 4 is a schematic diagram of an apparatus for controlling an air conditioner of an embodiment of the present disclosure.

The embodiment of the present disclosure further provides an apparatus for controlling an air conditioner. As shown in FIG. 4, the apparatus may include: an acquisition component 100 configured to acquire at least one operating environment parameter of the air conditioner, a determination component 200 configured to determine a target temperature of the air conditioner and a revolving speed of an internal fan according to the at least one operating environment parameter of the air conditioner, and an adjustment component 300 configured to adjust a frequency of a compressor on the basis of the operating environment parameter and the target temperature of the air conditioner and the revolving speed of the internal fan.

Figure 5:
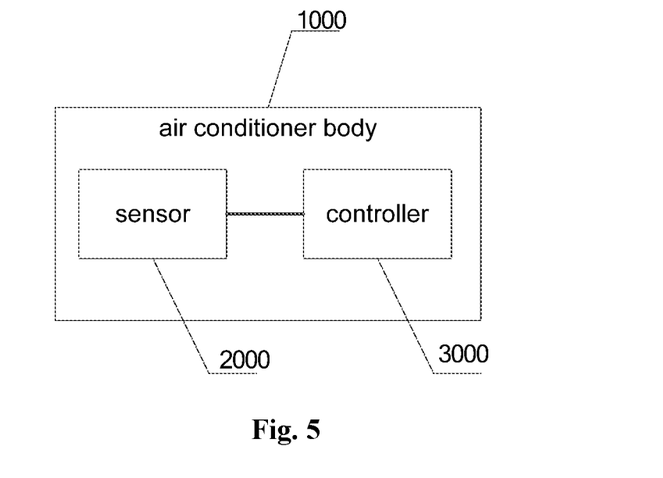
FIG. 5 is a schematic diagram of an air conditioner of an embodiment of the present disclosure.

The embodiment of the present disclosure further provides an air conditioner. As shown in FIG. 5, the air conditioner may include: an air conditioner body 1000, a sensor 2000 configured to collect at least one operating environment parameter of the air conditioner, and a controller 3000 configured to implement the method for controlling the air conditioner described in the abovementioned embodiment.

In an optional embodiment, the air conditioner may further include: an instruction sending apparatus configured on the air conditioner body or a remote controller of the air conditioner and configured to send a cool feeling control signal for characterizing to control the air conditioner to enter into a cool feeling mode and a stop signal for characterizing to control the air conditioner to quit the cool feeling mode through triggering a single button or a combined button.

Figure 6:
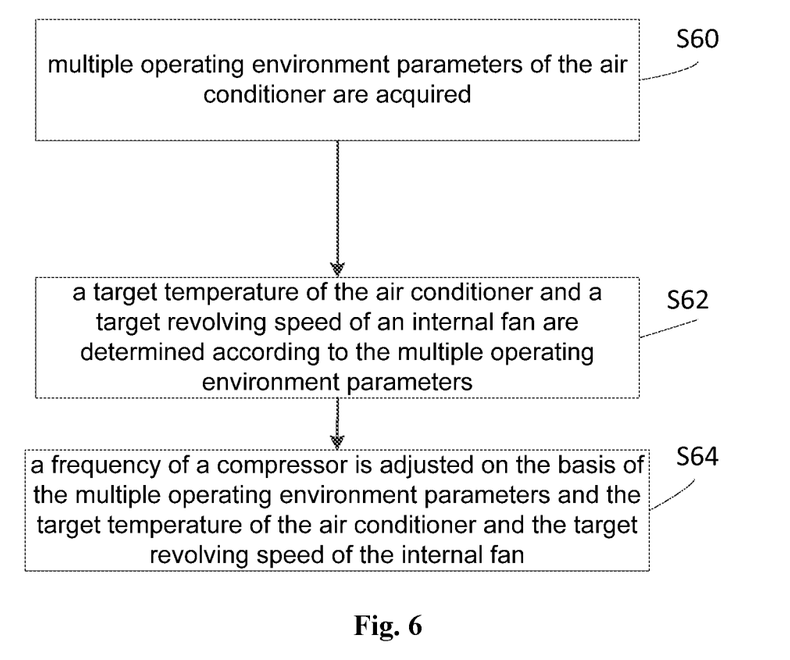
FIG. 6 is a flow diagram of another method for controlling an air conditioner of an embodiment of the present disclosure.

The embodiment of the present disclosure further provides another method for controlling an air conditioner. As shown in FIG. 6, the method may include the following steps: S60, multiple operating environment parameters of the air conditioner are acquired; S62, a target temperature of the air conditioner and a target revolving speed of an internal fan are determined according to the multiple operating environment parameters; and S64, a frequency of a compressor is adjusted on the basis of the multiple operating environment parameters and the target temperature of the air conditioner and the target revolving speed of the internal fan. Specific embodiment of the method for controlling the air conditioner may refer to the embodiment corresponding to FIG. 1, and will not be elaborated herein.

The embodiment of the present disclosure further provides a non-transitory storage medium. A non-transitory computer readable storage medium stores a computer instruction, and the computer instruction is configured to make a computer to implement the method for controlling the air conditioner described in any paragraph of the abovementioned embodiment. Herein, the storage medium may be a magnetic disc, an optical disc, a Read-Only Memory (ROM), a Random Access Memory (RAM), a Flash Memory, a Hard Disk Drive (HDD) or a Solid-State Drive (SSD) and the like, and the storage medium may further include a combination of all abovementioned kinds of memories.

Although the embodiments of the present disclosure are described in combination with the drawings, various modifications and variations may be made by the those skilled in the art without departing from the spirit and scope of the present disclosure, and these modifications and variations shall fall within the scope defined by appended claims.

INDUSTRIAL APPLICABILITY

The solutions provided by the embodiments of the present disclosure may be applied to a control process of an air conditioner. With the adoption of the solution, the air conditioner may adjust a frequency of a compressor and improve a temperature control accuracy of the air conditioner. The frequency of the compressor of the air conditioner is subjected to closed-loop control according to at least one operating environment parameter of the air conditioner and a target temperature of the air conditioner and a revolving speed of an internal fan determined by the environment parameter, in this way a temperature adjusted by the air conditioner may be accurately controlled, and high comfort of the air conditioner and good user experience may be ensured.

What is claimed is:

1. A method for controlling an air conditioner, comprising:
    acquiring at least one operating environment parameter of the air conditioner;
    determining a target temperature of the air conditioner and a target revolving speed of an internal fan according to the at least one operating environment parameter of the air conditioner; and
    adjusting a frequency of a compressor on the basis of the operating environment parameter and the target temperature of the air conditioner and the target revolving speed of the internal fan;
    wherein the operating environment parameter of the air conditioner comprises any one of indoor humanity, an indoor temperature, an outdoor temperature, a setting temperature or an electrical parameter of an element of an air conditioning system or any combination thereof;
    wherein, determining the target temperature of the air conditioner according to the at least one operating environment parameter of the air conditioner comprises: calculating a first temperature difference between the indoor temperature and the setting temperature of the air conditioner, determining a temperature to be compensated according to any one of the indoor humidity, the first temperature difference, the outdoor temperature of the electrical parameter of the element of the air conditioning system of any combination thereof; and obtaining the target temperature of the air conditioner on the basis of the temperature to be compensated.

2. The method for controlling an air conditioner as claimed in claim 1, wherein, the air conditioner have multiple target temperatures; and obtaining the target temperature of the air conditioner on the basis of the temperature to be compensated comprises:
    acquiring a cooling rate in a process of achieving a last target temperature of the air conditioner;
    obtaining a current temperature to be compensated according to the cooling rate; and
    obtaining a current target temperature of the air conditioner on the basis of the last target temperature of the air conditioner and the current temperature to be compensated.

3. The method for controlling an air conditioner as claimed in claim 1, wherein, determining the target revolving speed of the internal fan according to the at least one operating environment parameter of the air conditioner comprises:
    calculating a first temperature difference between the indoor temperature and a preset temperature of the air conditioner; and
    determining the revolving speed of the internal fan according to any one of the indoor humidity, the first temperature difference, the outdoor temperature or the electrical parameter of the element of the air conditioning system or any combination thereof.

4. The method for controlling an air conditioner as claimed in claim 3, wherein, determining the target revolving speed of the internal fan according to the at least one operating environment parameter of the air conditioner comprises:
    calculating a first temperature difference between the indoor temperature and the preset temperature of the air conditioner;
    determining the revolving speed to be compensated according to any one of the indoor humidity, the first temperature difference, the outdoor temperature or the electrical parameter of the element of the air conditioning system or any combination thereof; and obtaining the target revolving speed of the internal fan according to the revolving speed to be compensated and a preset revolving speed.

5. The method for controlling an air conditioner as claimed in claim 1, wherein, before determining the target temperature of the air conditioner and the target revolving speed of the internal fan according to the at least one operating environment parameter of the air conditioner, further comprising:

controlling the air conditioner to enter into a cool feeling mode according to a preset condition.

6. The method for controlling an air conditioner as claimed in claim 5, wherein, controlling the air conditioner to enter into the cool feeling mode according to the preset condition comprises:

acquiring a cool feeling control signal for characterizing to control the air conditioner to enter into the cool feeling mode; and controlling the air conditioner to enter into the cool feeling mode according to the cool feeling control signal.

7. The method for controlling an air conditioner as claimed in claim 6, wherein, controlling the air conditioner to enter into the cool feeling mode according to the cool feeling control signal comprises:

calculating a duration from a moment of acquiring the cool feeling control signal to a moment of starting the air conditioner;

judging whether the duration is greater than a first preset duration;

controlling the air conditioner to operate in an initial cool feeling control mode in a case that the duration is less than the first preset duration; and controlling the air conditioner to enter into the cool feeling mode in a case that an operating duration of the initial cool feeling control mode exceeds a second preset duration.

8. The method for controlling an air conditioner as claimed in claim 7, wherein, controlling the air conditioner to operate in the initial cool feeling control mode comprises:

determining an initial revolving speed of the internal fan according to the at least one operating environment parameter of the air conditioner; and controlling the compressor to operate at a maximum frequency according to the initial revolving speed of the internal fan and/or the target temperature of the air conditioner.

9. The method for controlling an air conditioner as claimed in claim 7, wherein, the air conditioner is controlled to enter into the cool feeling mode in a case that the duration is greater than the first preset duration.

10. The method for controlling an air conditioner as claimed in claim 5, wherein, controlling the air conditioner to enter into the cool feeling mode according to the preset condition comprises:

judging whether the outdoor temperature exceeds a first preset value;

calculating a second temperature difference between the indoor temperature and the target temperature of the air conditioner in a case that the outdoor temperature exceeds the first preset value;

judging whether a duration of the second temperature difference exceeding a second preset value exceeds a third preset duration; and controlling the air conditioner to enter into the cool feeling mode in a case that the duration of the second temperature difference exceeding the second preset value exceeds the third preset duration.

11. The method for controlling an air conditioner as claimed in claim 10, wherein, after adjusting the frequency of the compressor on the basis of the operating environment parameter and the target temperature of the air conditioner and the revolving speed of the internal fan, further comprising:

judging whether a condition of quitting the cool feeling mode is satisfied; and controlling the air conditioner to quit the cool feeling mode in a case that the condition of quitting is satisfied.

12. The method for controlling an air conditioner as claimed in claim 11, wherein, judging whether the condition of quitting the cool feeling mode is satisfied comprises:

judging whether the second temperature difference is less than a third preset value; and determining the condition of quitting the cool feeling mode being satisfied in a case that the second temperature difference is less than the third preset value.

13. The method for controlling an air conditioner as claimed in claim 11, wherein, the operating environment parameter of the air conditioner further comprises: a temperature of outlet air and/or a temperature of an internal pipe;

judging whether the condition of quitting the cool feeling mode is satisfied comprises:

judging whether the temperature of the outlet air is less than a fourth preset value; and satisfying the condition of quitting in a case that the temperature of the outlet air is less than the fourth preset value;

and/or, judging whether the temperature of the internal pipe is less than a fifth preset value; and satisfying the condition of quitting in a case that the indoor temperature is less than the fifth preset value.

14. The method for controlling an air conditioner as claimed in claim 13, wherein, in a case that the temperature of the outlet air is less than the fourth preset value and/or in a case that the indoor temperature is less than the fifth preset value, comprising:

judging whether a duration of the temperature of the outlet air less than the fourth preset value exceeds a fourth preset duration; and determining the condition of quitting the cool feeling mode being satisfied in a case that the duration of the temperature of the outlet air less than the fourth preset value exceeds the fourth preset duration;

and/or, judging whether a duration of the temperature of the internal pipe less than the fifth preset value exceeds a fifth preset duration; and determining the condition of quitting the cool feeling mode being satisfied in a case that the duration of the temperature of the internal pipe less than the fifth preset value exceeds the fifth preset duration.

15. The method for controlling an air conditioner as claimed in claim 11, wherein, judging whether the condition of quitting the cool feeling mode is satisfied comprises:

judging whether a stop signal for characterizing to control the air conditioner to quit the cool feeling mode is acquired; and determining the condition of quitting the cool feeling mode being satisfied in a case that the stop signal is acquired.

16. An apparatus for controlling an air conditioner, comprising:
   at least one processor; and a computer readable storage, coupled to the at least one processor and storing at least one computer executable instructions thereon, which when the at least one computer executable instructions is executed by the at least one processor, cause the at least one processor to catty out following actions:
   acquiring at least one operating environment parameter of the air conditioner;
   determining a target temperature of the air conditioner and a target revolving speed of an internal fan according to the at least one operating environment parameter of the air conditioner; and
   adjusting a frequency of a compressor on the basis of the operating environment parameter and the target temperature of the air conditioner and the target revolving speed of the internal fan;
   wherein the operating environment parameter of the air conditioner comprises: any one of indoor humidity, an indoor temperature, an outdoor temperature, a setting temperature or an electrical parameter of an element of an air conditioning system or any combination thereof;
   wherein, determining the target temperature of the air conditioner according to the at least one operating environment parameter of the air conditioner comprises calculating a first temperature difference between the indoor temperature and the setting temperature of the air conditioner; determining a temperature to be compensated according to any one of the indoor humidity, the first temperature difference, the outdoor temperature or the electrical parameter of the element of the air conditioning system or any combination thereof; and obtaining the target temperature of the air conditioner on the basis of the temperature to be compensated.

17. An air conditioner, comprising:
   an air conditioner body;
   a sensor, configured to collect at least one operating environment parameter of the air conditioner; and
   a controller, configured to implement the method for controlling the air conditioner as claimed in claim 1.

18. The air conditioner as claimed in claim 17, further comprising:
   a single button or a combined button, configured on the air conditioner body or a remote controller of the air conditioner, and triggered to send a cool feeling control signal for characterizing to control the air conditioner to enter into a cool feeling mode and a stop signal for characterizing to control the air conditioner to quit the cool feeling mode.

* * * * *